United States Patent
Hettenkofer et al.

(10) Patent No.: US 12,157,561 B2
(45) Date of Patent: Dec. 3, 2024

(54) ROTORCRAFT HAVING AN ELECTRIC DRIVE FOR DRIVING A MAIN AND/OR TAIL ROTOR OF THE ROTORCRAFT

(71) Applicant: kopter group ag, Mollis (CH)

(72) Inventors: Johannes Hettenkofer, Ottobrunn (DE); Andreas Dummel, Hohenbrunn (DE); Detlev Even, Höhenkirchen-Siegertsbrunn (DE); Andreas Löwenstein, Wetzikon (CH)

(73) Assignee: KOPTER GROUP AG (CH)

( * ) Notice: Subject to any disclaimer, the term of this patent is extended or adjusted under 35 U.S.C. 154(b) by 718 days.

(21) Appl. No.: 17/255,469

(22) PCT Filed: Jun. 11, 2019

(86) PCT No.: PCT/EP2019/065161
§ 371 (c)(1),
(2) Date: Dec. 23, 2020

(87) PCT Pub. No.: WO2020/001970
PCT Pub. Date: Jan. 2, 2020

(65) Prior Publication Data
US 2021/0362844 A1    Nov. 25, 2021

(30) Foreign Application Priority Data
Jun. 25, 2018 (CH) ........................................ 0800/18
Oct. 19, 2018 (CH) ..................................... 01276/18

(51) Int. Cl.
*B64C 27/14* (2006.01)
*B64C 27/82* (2006.01)
(Continued)

(52) U.S. Cl.
CPC .............. *B64C 27/14* (2013.01); *B64C 27/82* (2013.01); *B64D 27/30* (2024.01); *B64D 31/06* (2013.01);
(Continued)

(58) Field of Classification Search
CPC ........................ B64C 2027/8209; B64D 35/02
See application file for complete search history.

(56) References Cited

U.S. PATENT DOCUMENTS

| 9,004,395 | B2 | 4/2015 | Botti et al. | |
| 2008/0058145 | A1* | 3/2008 | Holmes ................ | B60K 6/445 475/5 |

(Continued)

FOREIGN PATENT DOCUMENTS

| DE | 10 2010 021024 A1 | 11/2011 |
| EP | 2551190 A1 | 1/2013 |

(Continued)

OTHER PUBLICATIONS

Office Action dated Jul. 6, 2022, for Russian Patent Application No. 2021101336 (with English translation).

(Continued)

*Primary Examiner* — Nicholas McFall
(74) *Attorney, Agent, or Firm* — Lerner David LLP

(57) ABSTRACT

A rotorcraft having an electric drive for driving a main rotor of a rotorcraft, more particularly a helicopter, the electric drive comprising: a coupler for coupling the electric drive to a rotor mast, which can be coupled for conjoint rotation with a drive unit of a helicopter rotor transmission, for coupling for conjoint rotation with the main rotor or tail rotor. A rotorcraft with an electric drive is provided with which the space requirement is reduced, the construction is simplified and the maintenance requirement is reduced. This problem is solved in that the electric drive is designed as an electric (Continued)

ring motor, with the electric ring motor being arranged and attached coaxially with the rotor mast.

12 Claims, 7 Drawing Sheets

(51) Int. Cl.
  *B64D 27/30* (2024.01)
  *B64D 31/06* (2024.01)
  *B64D 35/02* (2024.01)
  *F16H 3/64* (2006.01)
  *H02K 1/2706* (2022.01)
  *H02K 1/2788* (2022.01)
  *H02K 7/116* (2006.01)
  *H02K 11/00* (2016.01)
  *B64D 27/02* (2006.01)

(52) U.S. Cl.
  CPC ............ *B64D 35/02* (2013.01); *F16H 3/64* (2013.01); *H02K 1/2706* (2013.01); *H02K 1/2788* (2022.01); *H02K 7/116* (2013.01); *H02K 11/0094* (2013.01); *B60L 2200/10* (2013.01); *B64C 2027/8209* (2013.01); *B64D 27/026* (2024.01)

(56) References Cited

U.S. PATENT DOCUMENTS

| | | | |
|---|---|---|---|
| 2013/0026303 A1* | 1/2013 | Wang | B64C 29/0033 244/7 R |
| 2014/0010652 A1 | 1/2014 | Suntharalingam et al. | |
| 2017/0225573 A1* | 8/2017 | Waltner | B60L 50/16 |
| 2018/0141649 A1* | 5/2018 | Köstli | B64C 27/12 |
| 2020/0047908 A1* | 2/2020 | Filipenko | B64D 37/30 |

FOREIGN PATENT DOCUMENTS

| | | |
|---|---|---|
| EP | 2571763 | 3/2013 |
| EP | 3 412 566 A1 | 12/2018 |
| JP | 2017-184504 | 10/2017 |
| JP | 2018-502242 | 1/2018 |
| JP | 201896540 | 6/2018 |
| RU | 2 629 473 C1 | 8/2017 |
| RU | 2 652 863 C1 | 5/2018 |
| WO | 2016030168 A1 | 3/2016 |

OTHER PUBLICATIONS

International Preliminary Report on Patentability dated Dec. 29, 2020 with Written Opinion for PCT/EP2019/065161 filed Jun. 11, 2019 (English translation).
Office Action from India Patent Office dated Aug. 26, 2022 for Indian Application No. 202127002973.
International Search Report dated Aug. 2, 2019 for PCT/EP2019/065161 filed Jun. 11, 2019.
Written Opinion for PCT/EP2019/065161 filed Jun. 11, 2019.
Office Action dated Mar. 31, 2022 for European Patent Application No. 19 731 197.0 (5 pages) with translation.
Machine Language Translation of JP 2017-184504.
Machine Language Translation of JP2018-502242.
Office Action Rejection from the Japanese Patent Office for Japanese Patent Application 2020-572527 dated Jan. 27, 2023—in Japanese.
Office Action Rejection from the Japanese Patent Office for Japanese Patent Application 2020-572527 dated Jan. 27, 2023—in English.
EP2571763 Machine Language English Translation.
JP 201896540 Machine Language English Translation.

\* cited by examiner

ROTORCRAFT HAVING AN ELECTRIC DRIVE FOR DRIVING A MAIN AND/OR TAIL ROTOR OF THE ROTORCRAFT

TECHNICAL FIELD

The present invention describes a rotorcraft having an electric drive for driving a main and/or tail rotor of the rotorcraft.

Furthermore, the present invention describes a rotorcraft with a hybrid drive for driving a main and/or tail rotor of the rotorcraft comprising the electric drive according to the invention as well as a second drive designed as a thermodynamic engine.

BACKGROUND

So-called multi-engine, in particular twin-engine helicopters, i.e. helicopters with a drive system comprising a plurality of engines or drives, are known from the prior art. Typically, a fuel, usually fossil fuels, is converted into mechanical work using one or more drives designed as a thermodynamic engine, and the main rotor is driven by a main rotor transmission or a helicopter rotor transmission or the tail rotor is driven by a tail rotor transmission.

In the event of an emergency in the form of a drive failure of such a multi-engine helicopter, the helicopter has been able to rely for a predetermined duration on the power of the further remaining engine in order to put the helicopter into a safe flight regime and to respond to the engine failure.

Even if there is no emergency situation, a multi-engine helicopter has the advantage that, for example, an improved load capacity can be ensured during flight by the power of a further engine.

A special form of such twin-engine helicopters are also helicopters with a hybrid drive known from the prior art, wherein in addition to a drive designed as a thermodynamic engine, additional mechanical work can be carried out by an electric drive and an associated electrical energy source. Such helicopters with a hybrid drive offer an additional safety advantage over twin-engine helicopters with only a fossil fuel supply, since for example the additional electrical energy supply can be used if the fossil fuel supply fails.

Furthermore, a hybrid drive with a drive designed as a thermodynamic engine and an electric drive is known from document US 2017/0225573 A1. The hybrid drive comprises a main drive formed by the thermodynamic engine and an auxiliary drive formed by the electric drive. The main drive comprises a drive designed as a thermodynamic engine, a main rotor transmission or a helicopter rotor transmission, a drive train or main motor shaft, and a main rotor shaft or a main rotor mast. Here, the main drive is mechanically connected to the main motor shaft, so that the main motor shaft can be set in rotation. Furthermore, the main motor shaft is connected via the main rotor transmission to the main rotor shaft which is fixedly connected to the main rotor, so that the main rotor can be set in rotation.

The auxiliary drive comprises an additional electrical energy source, an electric drive, and a drive train or an associated motor shaft. The electrical energy source provides the necessary energy for the electric drive.

According to an embodiment proposed in US 2017/0225573 A1, the electric drive can be in a mechanical operative connection with the main rotor shaft or the main rotor mast via the associated motor shaft, wherein the electric drive and the motor shaft are arranged parallel to the rotor mast.

The rotorcraft known from document US 2017/0225573 A1 with a hybrid drive has the drawback that a large space requirement, a complex construction and a high maintenance requirement results.

Due to the presence of two engines, such hybrid drives, shown for example in US 2017/0225573 A1, have the fundamental problem that the weight of the rotorcraft is disadvantageously increased compared to single-engine variants, but a higher safety level is achieved.

SUMMARY OF THE INVENTION

One aspect of the present invention is a rotorcraft with an electric drive, wherein the drawbacks of the prior art are overcome and in particular the space requirement is reduced, the construction is simplified and the maintenance requirement is reduced.

Another aspect of the present invention is a rotorcraft with a hybrid drive comprising the electric drive, wherein the drawbacks of the prior art are overcome by a compact and low-weight design.

Accordingly, embodiments of a rotorcraft with an electric drive and embodiments of a rotorcraft with a hybrid drive are disclosed herein.

According to the invention, the electric drive is designed as an electric ring motor, wherein the electric ring motor is arranged and attached coaxially with the rotor mast.

In the sense of the present invention, an electric ring motor is understood to mean a so-called torque motor with a hollow shaft. In the case of the electric ring motor type of motor, a centrally arranged motor shaft is thus dispensed with. An electric ring motor essentially comprises a ring serving as a stator and a ring serving as a rotor, wherein the electric ring motor is referred to as an "outer rotor" in the case of an outer rotor and an "inner rotor" in an inner rotor.

In the case of the present electric ring motor, the force effect arises in the air gap or magnetic gap between the rotor and the stator.

Such electric ring motors have the advantage over conventional electric motors with a motor shaft that high accelerations are enabled due to a large drive torque at low speed. Since no mechanical elements such as toothed belts etc. are required, moreover, a compact design can be achieved by using electric ring motors. In other words, an electric ring motor can be integrated in a particularly compact manner into an existing propulsion system of a rotorcraft. In addition, in the absence of mechanical elements, such electric ring motors are smooth-running, quiet and low-maintenance. The simple attachment of the electric ring motor to the motor mast, in particular in combination with a hybrid drive, favours a compact design. In contrast with this, the hybrid drive shown in US 2017/0225573 A1 has the drawback that an additional transmission is required for the coupling of the mechanical power of the electric drive disclosed here, so that a greater degree of complexity results due to an additional shaft and deflection gear unit.

In the sense of the present invention, rotor mast is understood to mean the tail rotor hub in the case of the tail rotor or the main rotor mast in case of the main rotor.

Further advantageous embodiments are also disclosed herein.

According to a preferred embodiment, the electric drive can be designed as an electric ring motor with an, in particular ring-shaped, inner rotor functioning as a rotor, wherein the inner rotor can be fixedly connected to the rotor mast.

Such a preferred embodiment has the advantage that a "gearbox" or a main rotor transmission can be dispensed with due to the direct transmission of power that is achieved from the electric drive designed as an electric ring motor to the rotor mast.

According to an alternative preferred embodiment, it is in principle conceivable for the electric drive to be designed as an electric ring motor with an, in particular ring-shaped, outer rotor functioning as a rotor, wherein the outer rotor can be fixedly connected to the rotor mast. The advantage of such an outer rotor variant is an even more compact design which can deliver still more torque. The high level of running safety and smooth running is provided just as in the case of the inner rotor.

According to a further preferred embodiment, the electric drive is designed as an electric ring motor with an integrated transmission for the power transmission to the rotor mast. Such a power transmission by means of an integrated transmission has the advantage that the most efficient engine speed, which is usually higher than the rotor speed, can be maintained. Furthermore, the advantage of a power transmission by means of an integrated transmission consists in the fact that a particularly high torque can be generated with the reduction ratio achieved here and an even more compact design can be assisted.

In principle, any suitable forms of an integrated transmission are conceivable. The electric drive as an electric ring motor with an integrated transmission designed as a planetary gear is however particularly preferred.

The electric drive can preferably be mechanically connected at least to the transmission housing of the helicopter transmission, in particular in that an outer ring of the electric drive functioning as a stator can be fixedly connected to the transmission housing.

The electric drive is particularly preferably designed and dimensioned such that a main rotor and/or tail rotor of a rotorcraft, in particular a helicopter, can be driven independently without an additional drive. In the sense of the present invention, an independent electric drive is understood to mean that a mechanical power of preferably at least 150 kW, more preferably 200 kW to 700 kW, still more preferably 300 kW to 600 kW, very particularly preferably around 600 kW can be achieved. As an example, a high torque of approximately 15,500 Nm can be achieved with an electric drive having around 600 kW mechanical power at a low speed of 371 rpm.

According to a preferred possible development of the present invention, a plurality of drives designed as electric ring motors can be arranged and attached one above the other coaxially with the rotor mast. In other words, a plurality of drives designed as electric ring motors can be stacked one above the other. The use of a plurality of stacked electric ring motors instead of a single one has the particular advantage that a modular structure of an electric drive can be achieved and different power stages can be manufactured with little effort in terms of production technology. As a result of the modular structure, a high power requirement can be distributed over several stages with lower electrical power, so that physically and in terms of production technology an advantage for the dissipation of power loss heat from the engine and the control system results on account of the resulting larger surface area. In addition, an electric drive, which is distributed over several stages, provides even better protection against the total failure of the second drive designed as a thermodynamic engine.

It can thus advantageously be ensured that, in the event of an emergency in the form of a failure of a second drive of the multi-engine helicopter designed, for example, as a thermodynamic engine, the emergency power output from the remaining electric drive can be relied on for a predetermined duration, in order to put the helicopter into a safe flight regime and to react to the engine failure.

In principle, the rotorcraft according to the invention can only comprise an independent electric drive designed as an electric ring motor and arranged coaxially with the rotor mast. Another aspect of the present invention, however, relates to a rotorcraft with a hybrid drive, comprising the electric drive according to the invention and a second drive designed as a thermodynamic engine, for example an internal combustion engine, a turbine engine, a positive ignition engine, a diesel engine, a fuel cell drive or suchlike.

In the case of such a hybrid drive, the electric drive can preferably be coupled to the second drive, which is designed as a thermodynamic engine, so that the electric drive can rotate with the second drive in a coupled state and the electric drive can thus support the second drive when the main rotor and/or tail rotor is driven or vice versa. In the sense of the present invention, such a hybrid drive can be understood as a hybrid drive designed in parallel.

In principle, the rotor master of the rotorcraft according to the invention can be designed in one piece. The rotor mast of the rotorcraft according to the invention is preferably designed in two parts and comprises a bearing mast and an outer mast, wherein the outer mast is designed as a hollow body mounted rotatable about a central axis relative to the bearing mast, concentrically surrounding the bearing mast, and wherein the outer mast can be operatively connected to the helicopter transmission, wherein the bearing mast can be mounted in a fixed position and rotationally fixed in the rotorcraft, so that the outer mast can be coupled rotationally fixed to a main rotor and can be set in rotation with the helicopter rotor transmission. In connection with a possible outer rotor variant, an inner ring functioning as a stator, for example, could be attached rotationally fixed to the bearing mast, while a ring-shaped outer rotor functioning as a rotor is attached to the outer mast. According to a further preferred possible development of the invention, even with such an outer rotor variant, a plurality of drives designed as electric ring motors can be arranged and attached coaxially to the rotor mast one above the other (i.e. stacked one above the other) with the aforementioned advantages of a stacked electric ring motor instead of a single one, i.e. a modular structure, simple achievement of different power stages, distribution of a high power requirement over several stages with low power. According to yet another preferred development, in the case of such an outer rotor variant with electric ring motors stacked one above the other, the ring motors can be designed with an integrated transmission designed as planetary gearing.

In the helicopter rotor transmission of the rotorcraft according to the invention, the rotor mast can preferably be coupled rotationally fixed to the drive unit designed as a drive gearwheel, wherein the drive gearwheel is mounted rotatably on the bearing mast by means of at least one radial bearing, and a rotation of at least one drive planetary gear on a side of a respective planetary gear carrier facing the drive gearwheel about a respective planetary gear axis can be achieved by means of a sun gear connected rotationally fixed to the drive gearwheel, and wherein at least one fixed-mounted planetary gear belonging to the at least one drive planetary gear is enclosed by an internally toothed gearwheel ring which can be rotated about a central axis and a power transmission device can be attached or is integrally moulded between the gearwheel ring and the outer mast, in such a way that, starting from a rotational movement of the drive gearwheel, the outer mast and the main rotor coupled rotationally fixed to the outer mast can be set in rotation.

In principle, however, it is also conceivable for a planetary gearing with non-stationary planetary gears to be used in the helicopter rotor transmission of the rotorcraft according to the invention. Here, the planetary gearing comprises a plurality of externally toothed planetary gears which are mounted on associated planetary carriers. For design-related reasons, the planetary gears are mounted rotatably in a locally fixed gearwheel ring. The non-stationary planetary gears each rotate about their planetary axis and rotate within the gearwheel ring about a central rotor axis. The rotation of the planetary gears takes place by means of a rotary drive of a central sun gear, which is also locally fixed, but is mounted so as to be rotatable about the central rotor axis. A drive rotates the central sun gear, so that the rotational movement is transmitted to the rotor mast via the sun gear and the planetary gears.

In connection with such an embodiment of the helicopter rotor transmission, a total failure of the main drive train can advantageously be compensated for completely for a certain time in order to ensure a safe landing.

In addition, the directly and quickly available additional power can be used to relieve or support the drive designed as a thermodynamic engine. As a result, possible advantages would be an improved service life of the drive designed as a thermodynamic engine, resulting for example in a saving on maintenance costs, and an improved efficiency in the drive, resulting for example in a reduction of the consumption of fossil fuel, along with a design of the drive system that is as simple and compact as possible.

BRIEF DESCRIPTION OF THE DRAWINGS

A preferred example of embodiment of the subject-matter of the invention is described below in connection with the appended drawings. In the figure.

DESCRIPTION

Figure 1:
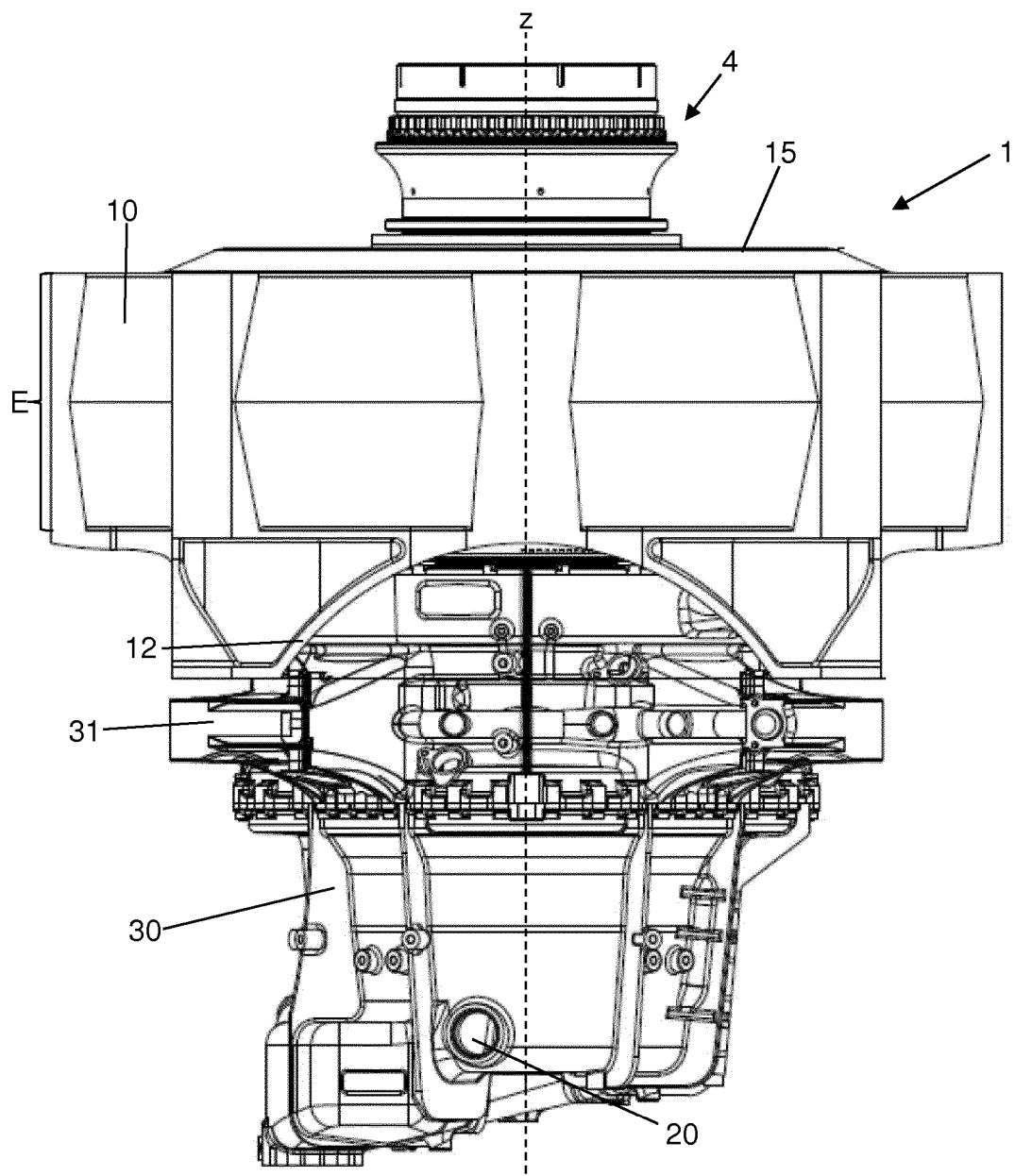
FIG. 1 shows a perspective view of a preferred embodiment of the rotorcraft according to the invention with a hybrid drive.
Figure 2:
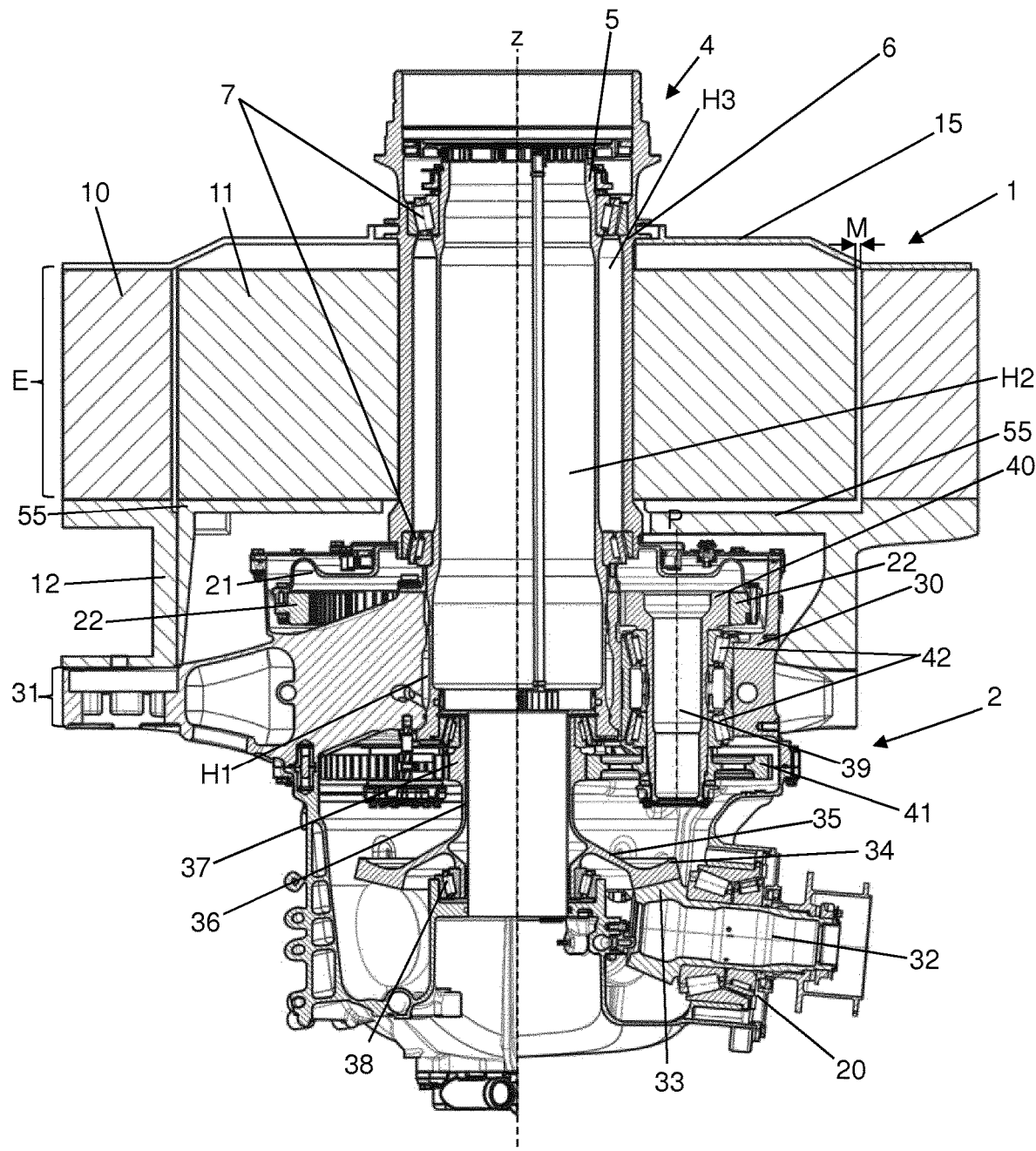
FIG. 2 shows a longitudinal section through the preferred embodiment of the rotorcraft according to the invention with the hybrid drive.

FIG. 1 shows a perspective view of a preferred embodiment of the rotorcraft according to the invention with a hybrid drive 1. As shown in FIG. 2 in detail, electric drive E shown here is mechanically connected at least to transmission housing 30 of helicopter rotor transmission or main rotor transmission 2, whereby an outer ring 10 of electric drive E functioning as a stator is connected by means of, in this case, four first fastening arms 12 of outer ring 10 to, in this case, four corresponding second fastening arms 31 of transmission housing 30.

FIG. 2 shows a longitudinal section through the preferred embodiment of the rotorcraft according to the invention with hybrid drive 1.

Hybrid drive 1 shown here comprises an electric drive E and a second drive TK, not shown here, designed as a thermodynamic engine, for example an internal combustion engine, a turbine engine, a positive ignition engine, a diesel engine, a fuel cell drive or suchlike.

Main rotor mast 4 designed in two parts, shown in FIG. 2, comprises a bearing mast 5 and an outer mast 6 designed as a hollow body with a cavity H3, wherein outer mast 6 surrounds bearing mast 5 concentrically about central axis z.

Electric drive E is designed as an electric ring motor, wherein the electric ring motor is arranged and attached coaxially with rotor mast 4, in particular coaxially with a central axis z running along the rotor mast or main rotor mast 4. Furthermore, the electric ring motor shown here is designed with a ring-shaped inner rotor 11 (i.e. forming an inner ring) which functions as a rotor, wherein inner rotor 11 is fixedly connected to outer mast 6 of main rotor mast 4.

According to the preferred embodiment of FIG. 2 shown here, electric drive E can be coupled with second drive TK, which is designed as a thermodynamic engine, in that inner rotor 11 of electric drive E is fixedly connected to outer mast 6 of main rotor mast 4 and, as explained below, main rotor transmission 2, which is operatively connected to the second drive, is connected, also rotationally fixed, to outer mast 6 via a gearwheel ring driver 21. In the preferred embodiment shown here, there is advantageously no direct mechanical contact area or no coupling between the fixed part (stator) of electric drive E and second drive TK designed as a thermodynamic engine. Due to the coaxially arranged ring motor, the operative connection here is purely electromagnetic. In other words, no additional effort has to be expended for freewheeling or non-operation in the case of electric drive E designed as a ring motor, as a result of which blocking of electric drive E is virtually ruled out.

In order to achieve an even higher level of safety, a decoupling mechanism could optionally be present even in the area between the rotating part (rotor) of electric drive E designed as a ring motor and the helicopter rotor transmission or second drive TK designed as a thermodynamic engine.

Electric drive E with the second drive in this coupled state can thus absorb an additional torque and thus electric drive E can support the second drive when driving the main rotor or vice versa.

Main rotor transmission 2 is enclosed by a transmission housing 30, so that the various components are kept protected from external influences. Electric drive E shown here is mechanically connected at least to transmission housing 30 of the helicopter rotor transmission or main rotor transmission 2, in particular in that an outer ring 10 of electric drive E functioning as a stator is firmly connected or fixed to transmission housing 30. In particular, first fastening arms 12 of outer ring 10 can be fixedly connected here to corresponding second fastening arms 31 of transmission housing 30.

As can be seen in FIG. 2, a magnetic gap M is formed here between outer ring 10 and inner rotor 11. Main rotor mast 4 is preferably produced in such a way that the required torque is generated by the magnetic fields or bending moments from the rotor have as little effect as possible or no effect on magnetic gap M between outer ring 10 and inner rotor 11. A cover 15 protects electric drive E against external environmental influences.

The main rotor transmission or helicopter rotor transmission 2 shown in FIG. 2 has a central cavity H1. Mounted in this central cavity H1 is a fixed and non-rotatable bearing mast 5, which here is designed as a hollow body with a cavity H2 and enclosing a central axis z. Central axis z at the same time forms the longitudinal direction of bearing mast 5 and an axis of rotation of the main rotor shaft or main rotor mast 4.

Bearing mast 5 is designed here completely traversing transmission housing 30, wherein for example control rods (not shown here) or electrical lines such as cables or suchlike can be passed through central cavity H2 in bearing mast 5 essentially along central axis z. As a result of such a relocation into bearing mast 5, compared to an arrangement outside main rotor mast 4, the control rods or cables cannot be damaged by external influences such as bird strike, etc. Furthermore, as a result of the relocation of the control rods into cavity H2 of bearing mast 5, sufficient space is created outside main rotor mast 4 for the attachment of an electric drive E, designed as an electric ring motor, coaxially with main rotor mast 4. In other words, the internal control rods and the associated possible dispensing with a swash plate outside rotor mast 4 permit easy attachment of an electric ring motor to rotor mast 4.

A deflection device for deflecting and aligning the control rods is preferably arranged on the drive train side on transmission housing 30.

A main drive train or drive train 32, which is received via an opening 20 in transmission housing 30, is in a mechanical operative connection with second drive TK, which is not shown here, designed as a thermodynamic engine. According to FIG. 2, drive gearwheel 34 is mounted rotatably here on bearing mast 5, wherein drive gearwheel 34 has bevel gear toothing here, which can interact with drive train gearwheel 33 of drive train 32. A second sun gear 35, designed as a hollow shaft, is connected to drive gearwheel 34 and has a tubular section 36 with external toothing system 37. By means of second sun gear 35, drive gearwheel 34 is mounted pushed onto locally and rotationally fixed bearing mast 5 so as to be rotatable about central axis z. Second sun gear 35—as shown here in FIG. 2—is mounted on sun gear bearing 38 so as to be rotatable on bearing mast 5. Second sun gear 35 can be driven by drive train 32, so that second sun gear 35 represents a driving hollow shaft. A plurality of drive planetary gears 41 is arranged on associated second planetary gear carriers 39 at the height of external toothing system of second sun gear 35, wherein planetary gear carriers 39 can be understood as planetary shafts. Drive planetary gears 41 each have an external toothing system and engage with external toothing system 37 of second sun gear 35. Second planetary gear carriers 39 are designed to be fixed and have a distance from transmission housing 30 or central axis z or from rotatable second sun gear 35, such that drive planetary gears 41 and their second planetary gear carriers 39 can be set into a fixed rotation within transmission housing 30. Second planetary gear carriers 39 are designed as double planetary carriers, since a second planetary gear 40 is arranged on each second planetary gear carrier 39 spaced apart in the direction of planetary gear axis P with respect to each drive planetary gear 41. Drive planetary gears 41 are each arranged parallel to associated second planetary gears 40. The plurality of second planetary gear carriers 39 are distributed around central axis z, around the outer circumference of bearing mast 5 and arranged in a fixed manner in transmission housing 30.

Main rotor transmission 2 shown here can be understood as a two-stage planetary gear. Bearing mast 5 traverses transmission housing 30 completely here and projects from transmission housing 30 on the side facing away from drive train 32.

A gearwheel ring 22 is arranged rotatably about central axis z at the level of second planetary gears 40 in the direction of central access z. Gearwheel ring 22 surrounds all second planetary gears 40, can be driven by the rotation of second planetary gears 40 and can thus be rotated about central axis z. Arranged on gearwheel ring 22 is a gearwheel ring driver 21 which functions as a force transmission device, by means of which the rotation of gearwheel ring 22 can be transferred to rotatable outer mast 6.

Figure 2A:
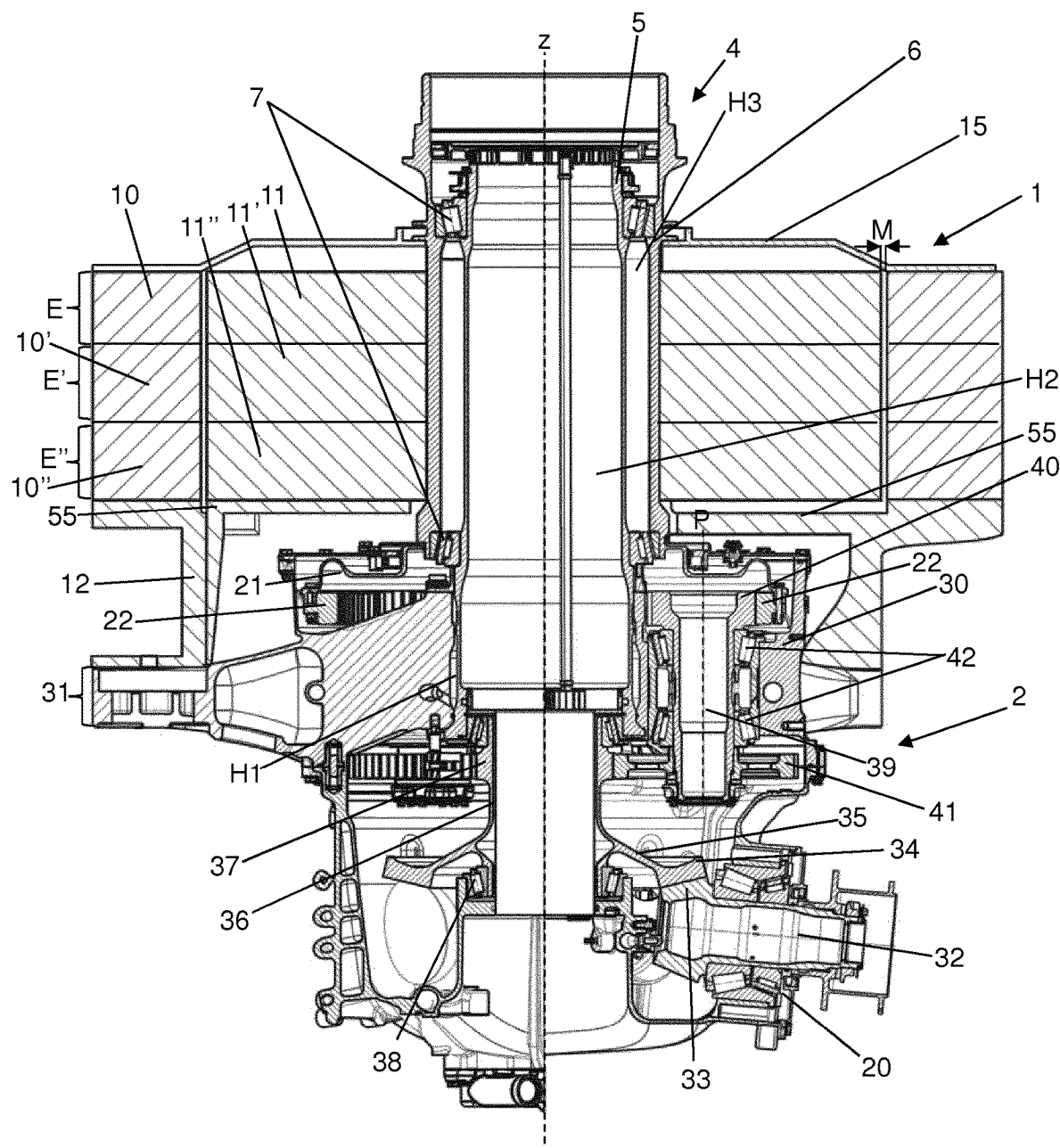
FIG. 2a shows a longitudinal section through a further preferred embodiment of the rotorcraft according to the invention with the hybrid drive, wherein a plurality of electric ring motors are stacked above one another.

FIG. 2a shows a longitudinal section through a further preferred embodiment of the rotorcraft according to the invention with the hybrid drive, wherein—in contrast with the embodiment shown in FIG. 2—a plurality, i.e. in this case three, electric ring motors E; E', E" are stacked above one another and each comprise an outer ring 10; 10'; 10" and an inner rotor 11; 11'; 11".

Figure 3:
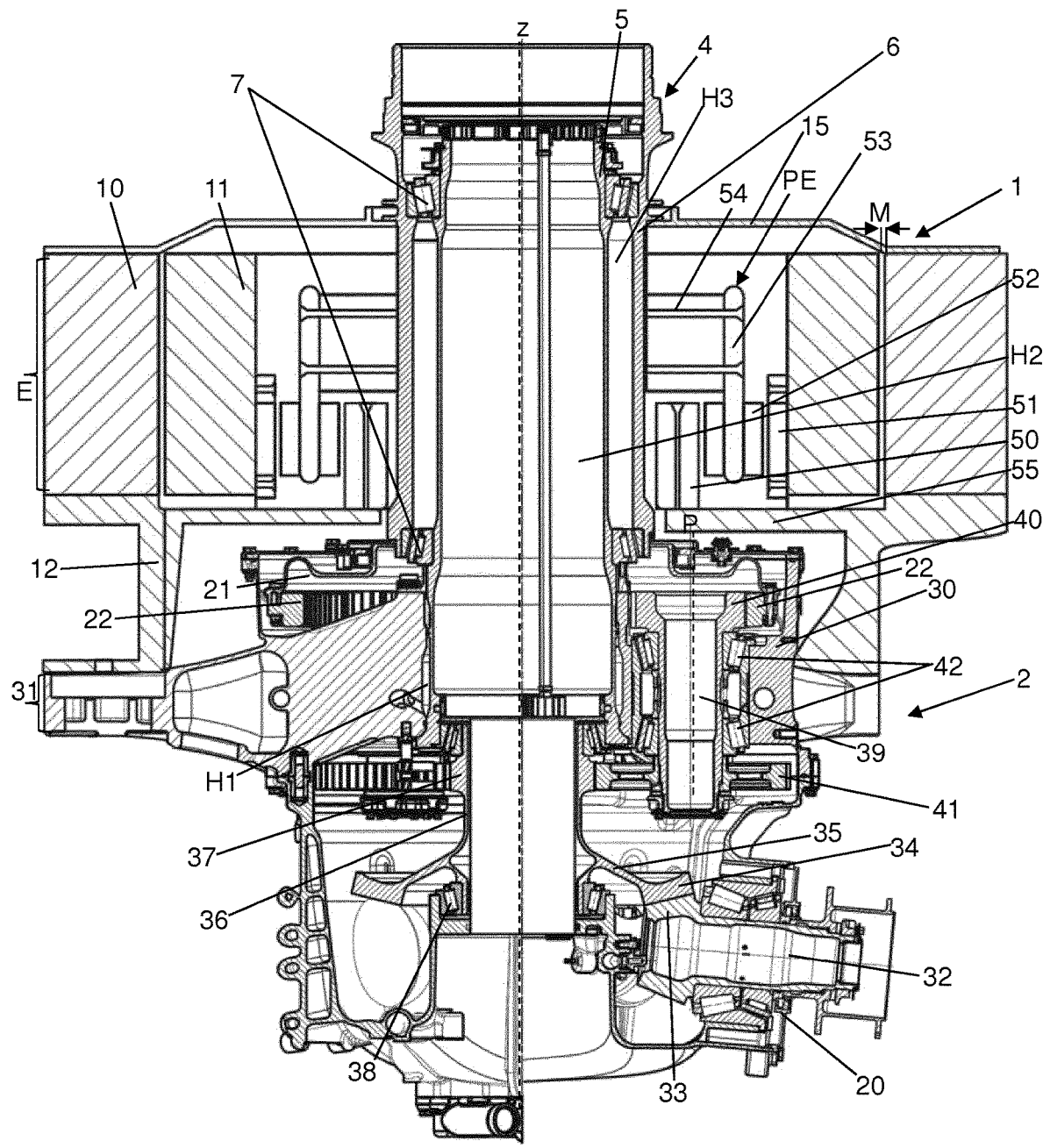
FIG. 3 shows a longitudinal section through the preferred embodiment of the rotorcraft according to the invention with the hybrid drive, wherein the electric drive is designed as an electric ring motor with an integrated transmission designed as planetary gearing.

FIG. 3 shows a longitudinal section through a further preferred embodiment of the rotorcraft according to the invention with hybrid drive 1, wherein electric drive E is designed as an electric ring motor with an integrated transmission designed as planetary gear PE. As can be seen in FIG. 3, main rotor transmission 2 corresponds to main rotor transmission 2 of the preferred embodiment shown in FIG. 2.

In the preferred embodiment shown here, an internally toothed ring gear 51 is arranged rotationally fixed on ring-shaped inner rotor 11 functioning as a rotor (i.e. forming an inner ring), so that internally toothed ring gear 51 participates in the rotation of inner rotor 11.

Planetary gear PE shown here comprises a plurality of externally toothed first planetary gears 52, which are mounted on associated first planetary carriers 53. The external toothing systems of first planetary gears 52 are engaged here with the internal toothing of ring gear 51. First planetary gears 52 are thus mounted rotatably in ring gear 51 for design-related reasons. Non-fixed planetary gears 52 each rotate about their planetary axis P and rotate within gearwheel ring 22 about a central rotor axis or central axis z. The rotation of first planetary gears 52 takes place here by means of a rotary drive of internally toothed ring gear 51 arranged on inner rotor 11 about a first sun gear 50 arranged here rotationally fixed, i.e. non-rotatable. As can be seen in FIG. 3, the rotationally fixed arrangement of first sun gear 50 in this further preferred embodiment is brought about by a fixed housing base 55, which creates a rigid connection between outer ring 10 and first sun gear 50.

Outer mast 6 is set in rotation via a rotationally fixed connecting element 54 between first planetary carriers 53 and outer mast 6.

Figure 3A:
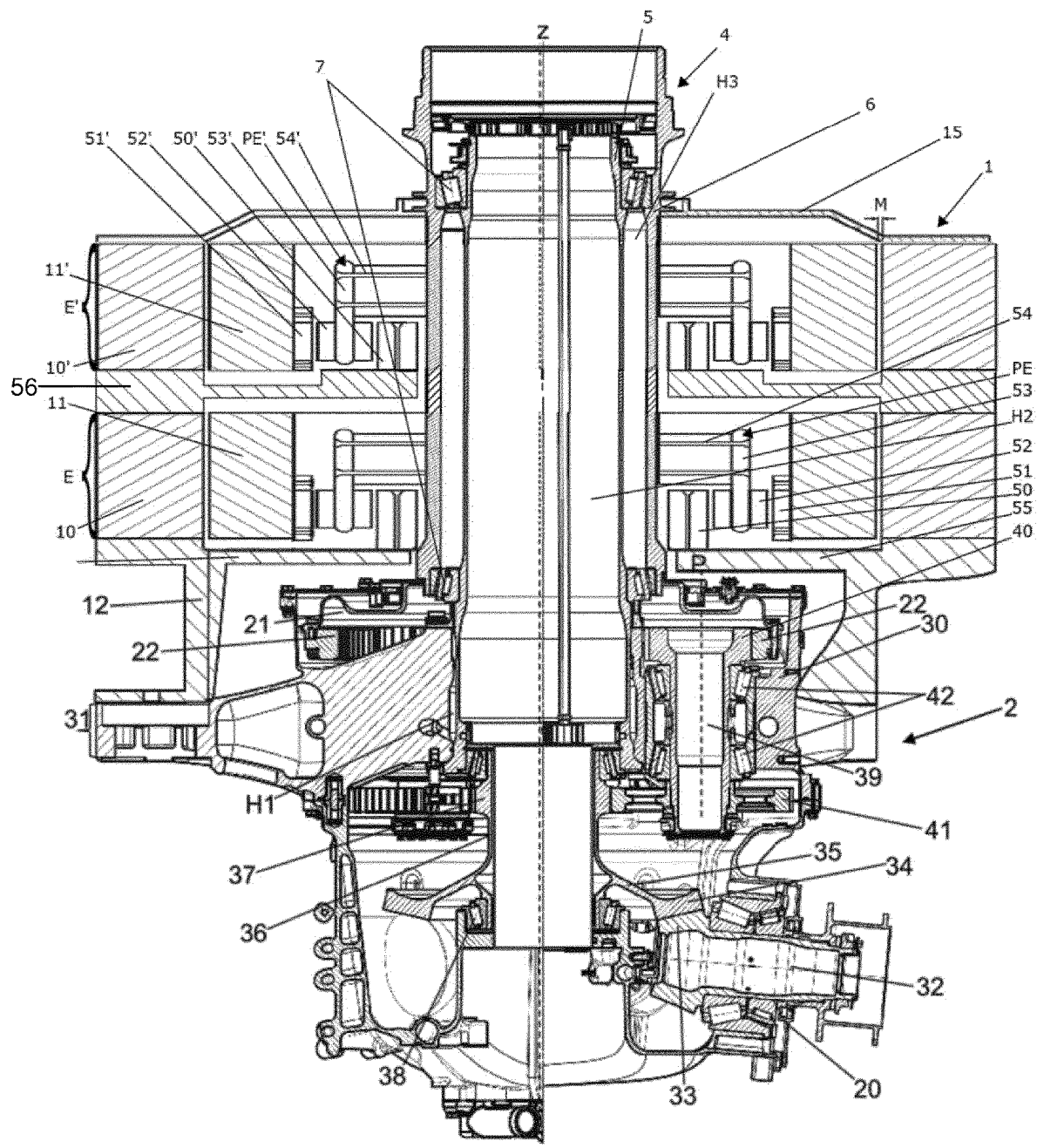
FIG. 3a shows a longitudinal section through a further preferred embodiment of the rotorcraft according to the invention with the hybrid drive and a plurality of electric ring motors stacked above one another, wherein the electric ring motors are designed with an integrated transmission designed as planetary gearing.

FIG. 3a shows a longitudinal section through a further preferred embodiment of the rotorcraft according to the invention with hybrid drive 1 and a plurality, i.e. in this case two, electric ring motors E; E' stacked one above the other, wherein electric ring motors E; E' are each designed with an integrated transmission designed as planetary gears PE; PE'. As can be seen in FIG. 3a, the two electric ring motors E; E' stacked one above the other each comprise first sun gears 50; 50', first internally toothed ring gears 51, 51', first planetary gears 52; 52', first planetary gear carriers 53; 53' and connecting elements 54; 54'. This further preferred embodiment comprises an intermediate base 56 between the two electric ring motors E; E' stacked one above the other, wherein intermediate base 56 creates a connection between outer rings 10; 10' and first sun gear 50', while fixed housing base 55 creates a rigid connection between outer ring 10 and first sun gear 50. This further preferred embodiment combines the advantages of a reduction ratio achieved by means of an integrated transmission with a particularly high generated torque and a modular construction of an electric drive with different achievable power levels, which is achieved by means of electric ring motors stacked one above the other.

Figure 4:
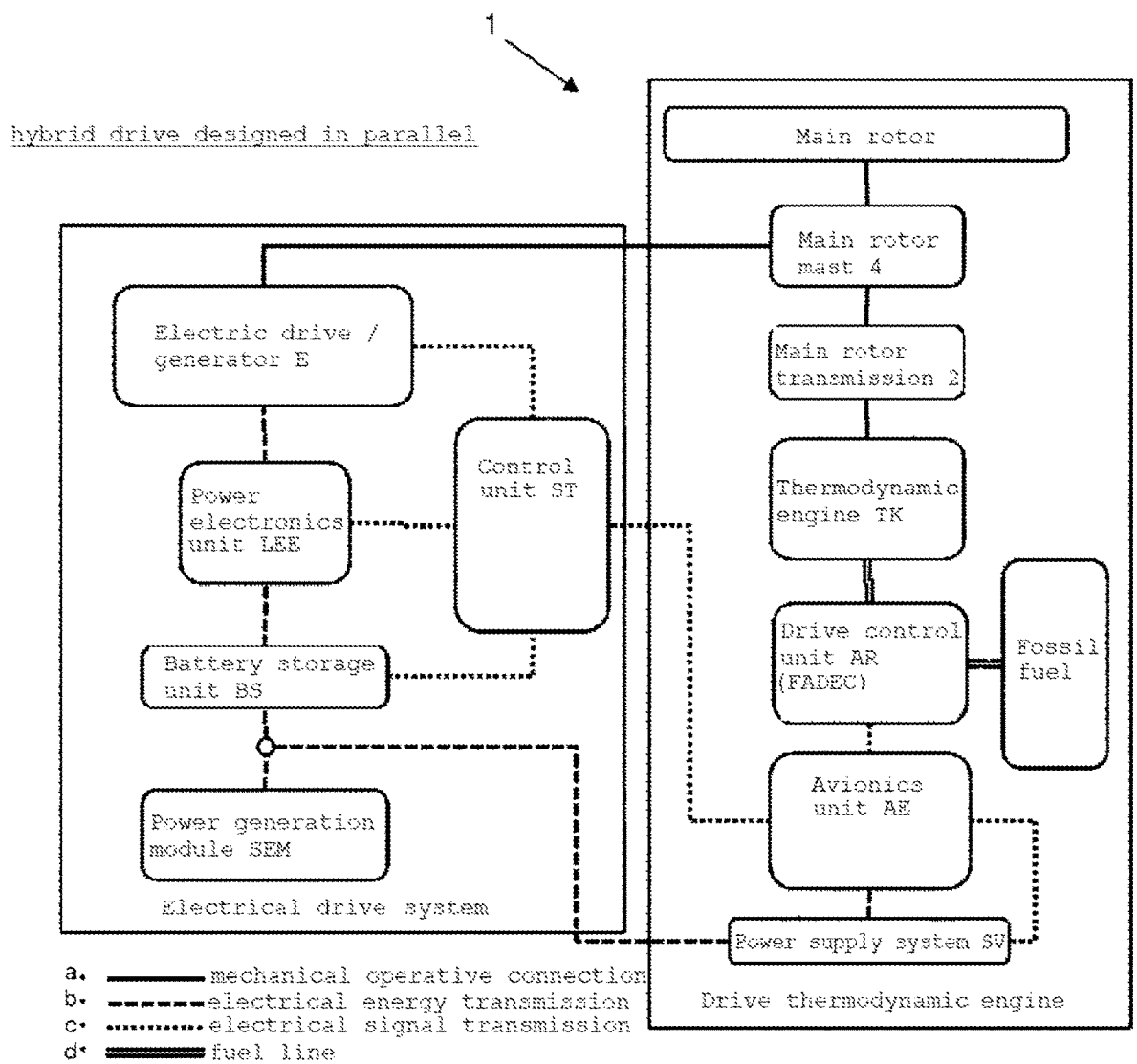
FIG. 4 shows a functional block diagram of the drive power control of the preferred embodiment of the rotorcraft according to the invention with a hybrid drive designed here in parallel.

FIG. 4 shows a functional block diagram of the drive power control of the preferred embodiment of the rotorcraft according to the invention with a hybrid drive 1 designed in parallel here. The main components of the electrical drive system are represented in a left-hand frame, while the main components of a drive TK designed as a thermodynamic machine are represented in a right-hand frame.

As already shown in FIG. 2, a drive TK designed as a thermodynamic engine and an electric drive E are mechanically operatively connected to main rotor mast 4 in the rotorcraft according to the invention with a hybrid drive 1.

As can be seen in FIG. 4, the rotorcraft comprises here a control unit ST and a power electronics unit LEE (also referred to as an "inverter"), wherein power electronics unit LEE interacts with control unit ST on the basis of an electrical signal transmission c. Furthermore, power electronics unit LEE is designed in such a way that, on the basis of electrical energy transmission b, electrical energy is taken from the electrical energy source in the form of a battery storage unit BS and relayed to electric drive E in the form of electric current.

Control unit ST is designed in such a way that, based on an electrical signal transmission c, it can pick up sensor input data via an avionics unit AE from second drive TK designed as a thermodynamic engine, from electric drive E, from the pilot control and from the energy source; and can relay output data to power electronics unit LEE.

As can be seen in the right-hand frame of FIG. 4, a second drive TK designed as a thermodynamic engine is operated here by means of a drive control unit AR via a fuel line d conveying a fossil fuel. Second drive TK, designed as a thermodynamic engine, is in a mechanical operative connection a with the main motor via a main rotor transmission 2 and main rotor mast 4. Drive control unit AR is preferably designed autonomous and fully digital as a so-called FADEC, so that second drive TK is controlled independently in all operating states.

By means of an electronic signal transmission c, drive control unit AR, designed as a FADEC, can be connected to an avionics unit AE, wherein avionics unit AE detects the output power originating from second drive TK and can relay the latter to control unit ST by means of electronic signal transmission c.

The rotorcraft according to the invention can comprise an additional power supply system SV, which ensures an additional power supply for avionics unit AE and battery storage unit BS.

In particular, control unit ST can be designed with logic such that, starting from power electronics unit LEE, the output power of electric drive E can be set depending on the flight conditions, the flight profile, the battery level, and the output power originating from second drive TK. In other words, in the event of failure of second drive TK, control unit ST could automatically increase the output power of electric drive E if necessary.

In addition, electric drive E of hybrid drive 1 of the rotorcraft according to the invention, in a rotationally fixed coupled state between electric drive E and second drive TK designed as a thermodynamic engine, and during the operation of second drive TK of electric drive E which is not in operation, can function as a generator for an additional energy recovery for battery storage unit BS. A rectifier, for example in the form of a blocking diode, is preferably provided in power electronics unit LEE or in electronic drive E, so that battery storage unit BS can be charged when electric drive E is not in operation. Although the electric drive can already function as a generator in the embodiment shown in FIG. 4, the rotorcraft according to the invention can optionally comprise additional power generation modules SEM for charging battery storage unit BS.

Particularly preferably, the logic of control unit ST further permits an automatic mode change between the torque generation for driving the rotor and the additional energy recovery for battery storage unit BS.

Figure 5:
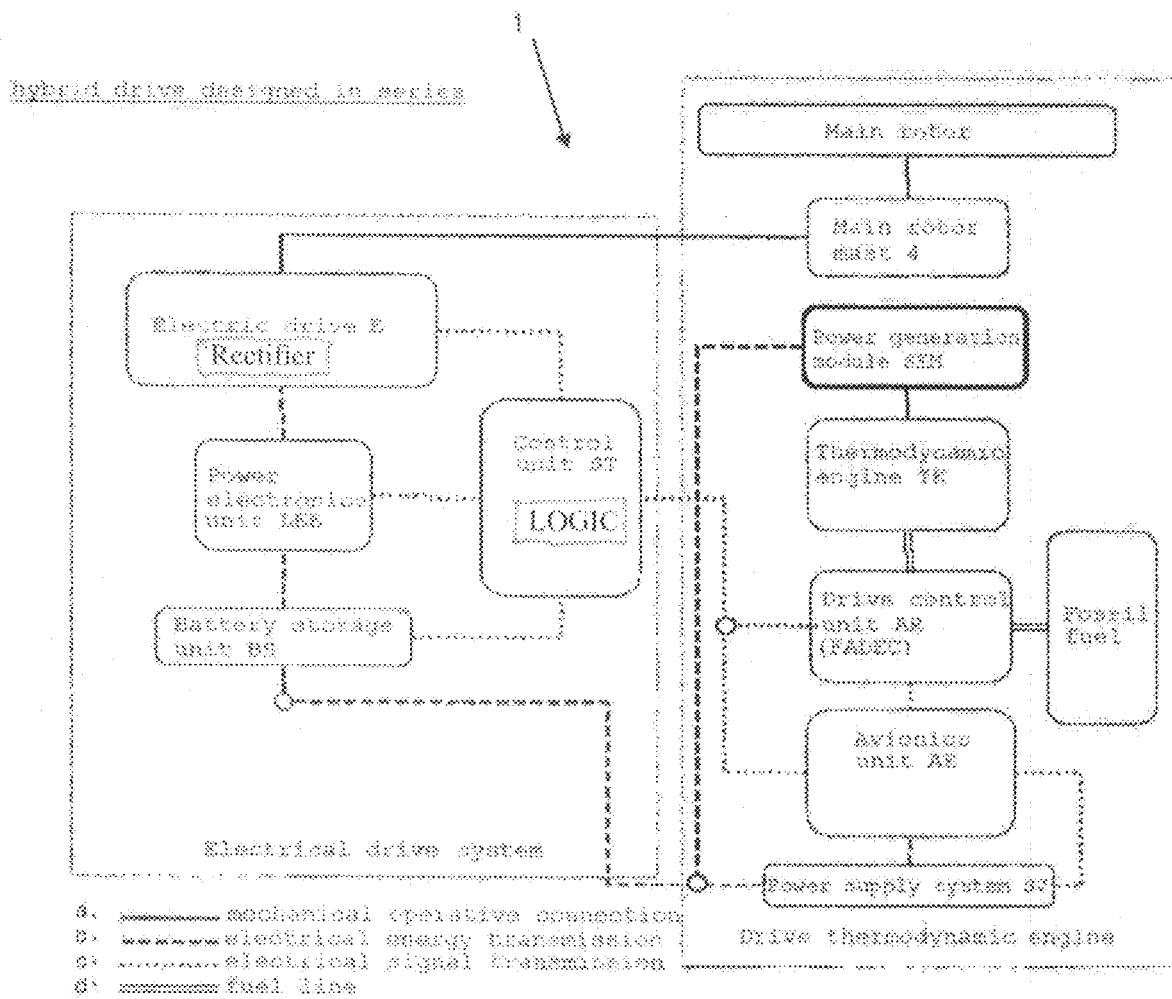
FIG. 5 shows a functional block diagram of the drive power control of a further preferred embodiment of the rotorcraft according to the invention with a hybrid drive designed here in series.

FIG. 5 shows a functional block diagram of the drive power control of the further preferred embodiment of the rotorcraft according to the invention with a hybrid drive 1 designed here in series. As can be seen in FIG. 5, there is, as an essential difference from hybrid drive 1 designed in parallel shown in FIG. 4, no mechanical operative connection between second drive TK designed as a thermodynamic engine and main rotor mast 4 or the main rotor.

According to this further preferred embodiment, the rotorcraft according to the invention can comprise additional power generation modules SEM, which are mechanically coupled with drive 2, for charging battery storage unit BS via an additional electrical energy transfer b in order to enable a continuous operation of electric drive E designed as an electric ring motor during an entire mission or an entire flight. In connection with such a preferably independent electric drive E, power generation modules SEM must be correspondingly able to supply enough power to guarantee the independent operation of electric drive E. The at least one power generation module SEM functions here as an additional power generator which completely supplies all the energy for a continuous operation of electric drive E.

Furthermore, according to the further preferred embodiment shown here, second drive TK can be switched on as required via an additional electrical signal transmission c between control unit ST and drive control unit AR designed as a FADEC, or second drive TK can be put into operation as required.

In the further preferred embodiment shown here, drive TK designed as a thermodynamic engine can only be understood as a means for extending the flight range.

REFERENCE LIST 1 hybrid drive
2 main rotor transmission
4 rotor mast or main rotor mast
5 bearing mast
6 outer mast
7 bearing (between bearing mast and outer mast)
10 outer ring
11 inner rotor 12 first fastening arm (of the outer ring functioning as a stator)
15 cover (of the electric drive)
20 opening (in the transmission housing for receiving the drive train)
21 gearwheel ring driver (as a power transmission means)
22 gearwheel ring
30 transmission housing (of the main transmission)
31 second fastening arm (of the transmission housing)
32 drive train
33 drive train gearwheel
34 drive gearwheel
35 second sun gear
36 tubular section
37 outer toothing system (of the tubular section)
38 sun gear bearing
39 second planetary gear carrier
40 second planetary gear
41 drive planetary gear
42 planetary gear carrier bearing
50; 50' first sun gear (of the integrated planetary gearing in the ring motor)
51; 51' ring gear
52; 52' first planetary gear (of the integrated planetary gearing in the ring motor)
53; 53' first planetary gear carrier (of the integrated planetary gearing in the ring motor)
54; 54' connecting element (between the planetary carrier and the outer mast)
55 housing base (connection between outer ring and first sun gear 50)
56 intermediate base (connection between outer ring and first sun gear 50')
BS battery storage unit
E; E'; E" electric drive
H1 first cavity (of the transmission housing of the main transmission)
H2 second cavity (of the bearing mast)
H3 third cavity (of the outer mast)
M magnetic gap (between inner rotor and outer ring)
P planetary gear axis
PE; PE' planetary gear (of the electric drive)
SEM power generation modules
ST control unit
TK second drive designed as a thermodynamic engine
z central axis

We claim:

1. A rotorcraft with a hybrid drive, comprising at least one electric drive for driving a main rotor of the rotorcraft and a second drive designed as a thermodynamic engine, wherein the at least one electric drive comprises: means for coupling the at least one electric drive with a rotor mast, which is couplable rotationally fixed with a drive unit of a rotor transmission, for the rotationally fixed coupling with the main rotor, wherein the at least one electric drive is designed as at least one electric ring motor, and wherein the at least one electric ring motor is arranged and attached coaxially with the rotor mast, wherein the at least one electric drive is designed as an electric ring motor with an inner rotor functioning as a rotor, wherein the inner rotor is fixedly connectable directly to the rotor mast;

wherein the rotor mast is designed in two parts and comprises a bearing mast and an outer mast, wherein the outer mast is designed as a hollow body mounted rotatable about a central axis relative to the bearing mast, concentrically surrounding the bearing mast, and wherein the outer mast is operatively connectable to the rotor transmission, wherein the bearing mast is mountable in a fixed position and rotationally fixed in the rotorcraft, so that the outer mast is coupled rotationally fixed to the rotor and is settable in rotation with the rotor transmission; and wherein the inner rotor is fixedly connected to the outer mast.

2. The rotorcraft according to claim 1, wherein the at least one electric drive is mechanically connectable at least to a transmission housing of the rotorcraft rotor transmission, and wherein an outer ring of the at least one electric drive functioning as a stator is fixedly connectable to the transmission housing.

3. The rotorcraft according to claim 1, wherein the at least one electric drive is designed and dimensioned such that a main rotor of the rotorcraft is drivable independently without an additional drive.

4. The rotorcraft according to claim 1, wherein the at least one electric drive comprises a plurality of electric drives designed as electric ring motors which are arranged and attached above one another coaxially with the rotor mast.

5. The rotorcraft according to claim 1, wherein the electric drive is mechanically couplable with the second drive so that the electric drive can rotate with the second drive in a coupled state and the electric drive can thus support the second drive when the main rotor is driven or vice versa to form a hybrid drive connected in parallel.

6. The rotorcraft according to claim 5, wherein the hybrid drive comprises an electrical energy source and wherein the electric drive of the hybrid drive, in a rotationally fixed coupled state between the electric drive and the second drive and during the operation of the second drive of the electric drive, can function as a generator for additional energy recovery for a battery storage unit.

7. The rotorcraft according to claim 6, wherein a rectifier is provided in the electric drive so that the battery storage unit is chargeable when the electric drive is not in operation.

8. The rotorcraft according to claim 1, wherein the bearing mast is designed as a hollow body, so that control rods and/or cables are arrangeable completely passing through the bearing mast and the outer mast in the direction of the central axis.

9. The rotorcraft according to claim 8, wherein the rotor mast is couplable rotationally fixed to the drive unit designed as a drive gearwheel, wherein the drive gearwheel is mountable rotatably on the bearing mast by means of at least one radial bearing, and a rotation of at least one drive planetary gear on a side of a respective second planetary gear carrier facing the drive gearwheel about a respective planetary gear axis is achievable by means of a second sun gear connected rotationally fixed to the drive gearwheel, and wherein at least one fixed-mounted second planetary gear belonging to the at least one drive planetary gear is enclosed by an internally toothed gearwheel ring which is rotatable about the central axis and a power transmission device is attachable or is integrally moulded between the gearwheel ring and the outer mast, in such a way that, starting from a rotational movement of the drive gearwheel, the outer mast and the main rotor coupled rotationally fixed to the outer mast are settable in rotation.

10. The rotorcraft according to claim 1, wherein the rotorcraft comprises a control unit and a power electronics unit, wherein the power electronics unit can interact with the control unit, an electrical energy source and the power electronics unit can take electrical energy from the energy source and relay the latter in the form of electric current to the electric drive, wherein the control unit is designed such that it can pick up the sensor input data from the second drive, from the electric drive, from the pilot control, and from the electrical energy source; and can relay output data to power electronics unit, and wherein the control unit is designed with logic, so that, starting from power electronics unit, the output power of electric drive can be set depending on the flight conditions, the flight profile, the battery level, and the output power originating from the second drive.

11. The rotorcraft according to claim 10, wherein the logic of the control unit further permits an automatic mode change between the torque generation for driving the rotor and the additional energy recovery for the energy source.

12. The rotorcraft according to claim 10, wherein the rotorcraft comprises additional power generation modules, which are mechanically coupled with the second drive, for charging the battery storage unit, so that a hybrid drive designed in series is obtained.

* * * * *

UNITED STATES PATENT AND TRADEMARK OFFICE
CERTIFICATE OF CORRECTION

| | | |
|---|---|---|
| PATENT NO. | : 12,157,561 B2 | Page 1 of 1 |
| APPLICATION NO. | : 17/255469 | |
| DATED | : December 3, 2024 | |
| INVENTOR(S) | : Johannes Hettenkofer et al. | |

It is certified that error appears in the above-identified patent and that said Letters Patent is hereby corrected as shown below:

On the Title Page

Item (30):
Foreign Application No. 0800/18 should be 00800/18

Signed and Sealed this
Thirty-first Day of December, 2024

Derrick Brent
*Acting Director of the United States Patent and Trademark Office*